US011156294B2

(12) United States Patent
Theratil et al.

(10) Patent No.: US 11,156,294 B2
(45) Date of Patent: Oct. 26, 2021

(54) CONTROLLED GAP SEAL WITH SURFACE DISCONTINUITIES

(71) Applicant: PRATT & WHITNEY CANADA CORP., Longueuil (CA)

(72) Inventors: Ignatius Theratil, Mississauga (CA); Aldo Abate, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 41 days.

(21) Appl. No.: 16/204,367

(22) Filed: Nov. 29, 2018

(65) Prior Publication Data

US 2019/0376401 A1 Dec. 12, 2019

Related U.S. Application Data

(60) Provisional application No. 62/682,357, filed on Jun. 8, 2018.

(51) Int. Cl.
*F16J 15/44* (2006.01)
*F01D 11/00* (2006.01)
*F01D 11/02* (2006.01)
*F01D 11/06* (2006.01)

(52) U.S. Cl.
CPC .......... *F16J 15/441* (2013.01); *F01D 11/003* (2013.01); *F01D 11/025* (2013.01); *F16J 15/44* (2013.01); *F01D 11/06* (2013.01); *F05D 2220/32* (2013.01); *F05D 2240/50* (2013.01); *F05D 2240/55* (2013.01); *F05D 2260/98* (2013.01); *F16J 15/445* (2013.01)

(58) Field of Classification Search
CPC ...... F01D 11/003; F01D 11/02; F01D 11/025; F01D 11/183; F16J 15/30; F16J 15/44; F16J 15/441; F16J 15/445; F05D 2240/55; F05D 2220/32
See application file for complete search history.

(56) References Cited

U.S. PATENT DOCUMENTS

| 4,662,820 A | 5/1987 | Sasada et al. |
| 5,593,165 A * | 1/1997 | Murray ................. F01D 11/003 277/543 |
| 7,363,762 B2 | 4/2008 | Montgomery et al. |
| 7,931,277 B2 * | 4/2011 | Garrison ................ F16J 15/441 277/399 |
| 7,963,525 B1 * | 6/2011 | Garrison ................ F16J 15/442 277/416 |

(Continued)

*Primary Examiner* — Nicholas L Foster
(74) *Attorney, Agent, or Firm* — Norton Rose Fulbright Canada LLP

(57) ABSTRACT

There is disclosed a controlled gap seal for a gas turbine engine including a ring configured to be in a sealing engagement with a housing and a runner configured for rotation relative to the ring about the central axis. The runner has a runner face facing a ring face of the ring. The ring face is spaced apart from the runner face by a gap. A plurality of surface discontinuities are circumferentially distributed around the central axis on the runner face and/or the ring face. The plurality of surface discontinuities are spaced relative to one another such that a first set of adjacent surface discontinuities are circumferentially spaced from each other at a different distance than a second set of adjacent surface discontinuities. A method of using the controlled gap seal is disclosed.

20 Claims, 7 Drawing Sheets

(56) References Cited

U.S. PATENT DOCUMENTS

| | | | | |
|---|---|---|---|---|
| 8,091,898 B2* | 1/2012 | Garrison | ............... | F16J 15/40 |
| | | | | 277/399 |
| 8,490,982 B2* | 7/2013 | Roche | ............... | F01D 11/02 |
| | | | | 277/430 |
| 8,905,408 B2* | 12/2014 | Garrison | ............... | F02C 7/28 |
| | | | | 277/418 |
| 9,353,639 B2* | 5/2016 | Garrison | ............... | F01D 11/00 |
| 9,879,786 B2 | 1/2018 | Kuwamura et al. | | |
| 2006/0033287 A1* | 2/2006 | Rago | ............... | F16J 15/441 |
| | | | | 277/411 |
| 2009/0322031 A1* | 12/2009 | Roche | ............... | F01D 11/02 |
| | | | | 277/348 |
| 2011/0049809 A1* | 3/2011 | Garrison | ............ | F01D 25/183 |
| | | | | 277/304 |
| 2011/0127726 A1* | 6/2011 | Garrison | ............ | F16J 15/442 |
| | | | | 277/304 |
| 2011/0215529 A1* | 9/2011 | Garrison | ............ | F01D 25/183 |
| | | | | 277/300 |
| 2013/0241153 A1* | 9/2013 | Garrison | ............... | F16J 15/40 |
| | | | | 277/350 |
| 2016/0201848 A1 | 7/2016 | Bordne et al. | | |
| 2019/0376402 A1* | 12/2019 | Theratil | ............... | F01D 11/06 |
| 2020/0116047 A1* | 4/2020 | Theratil | ............... | F02C 7/06 |

* cited by examiner

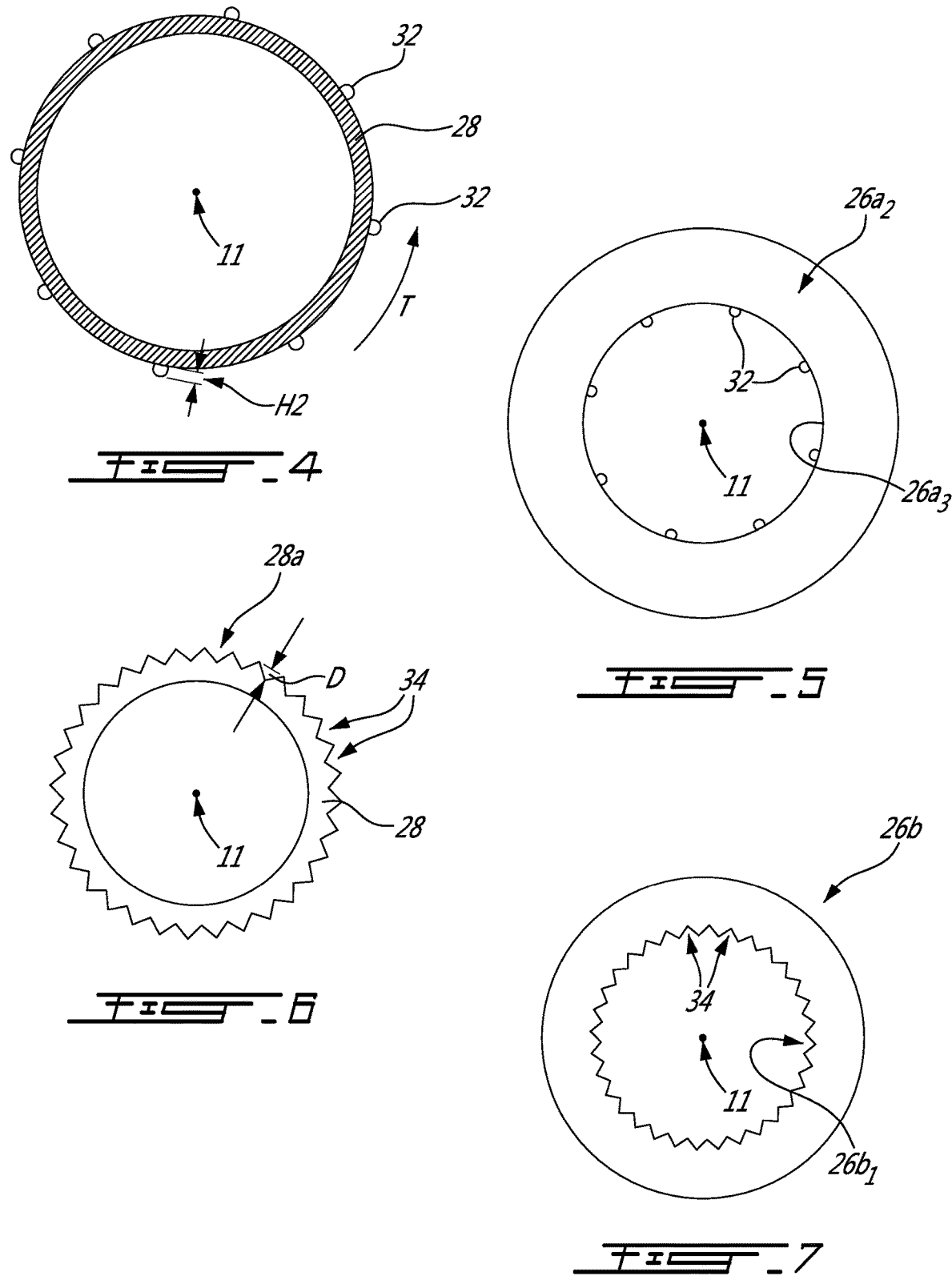

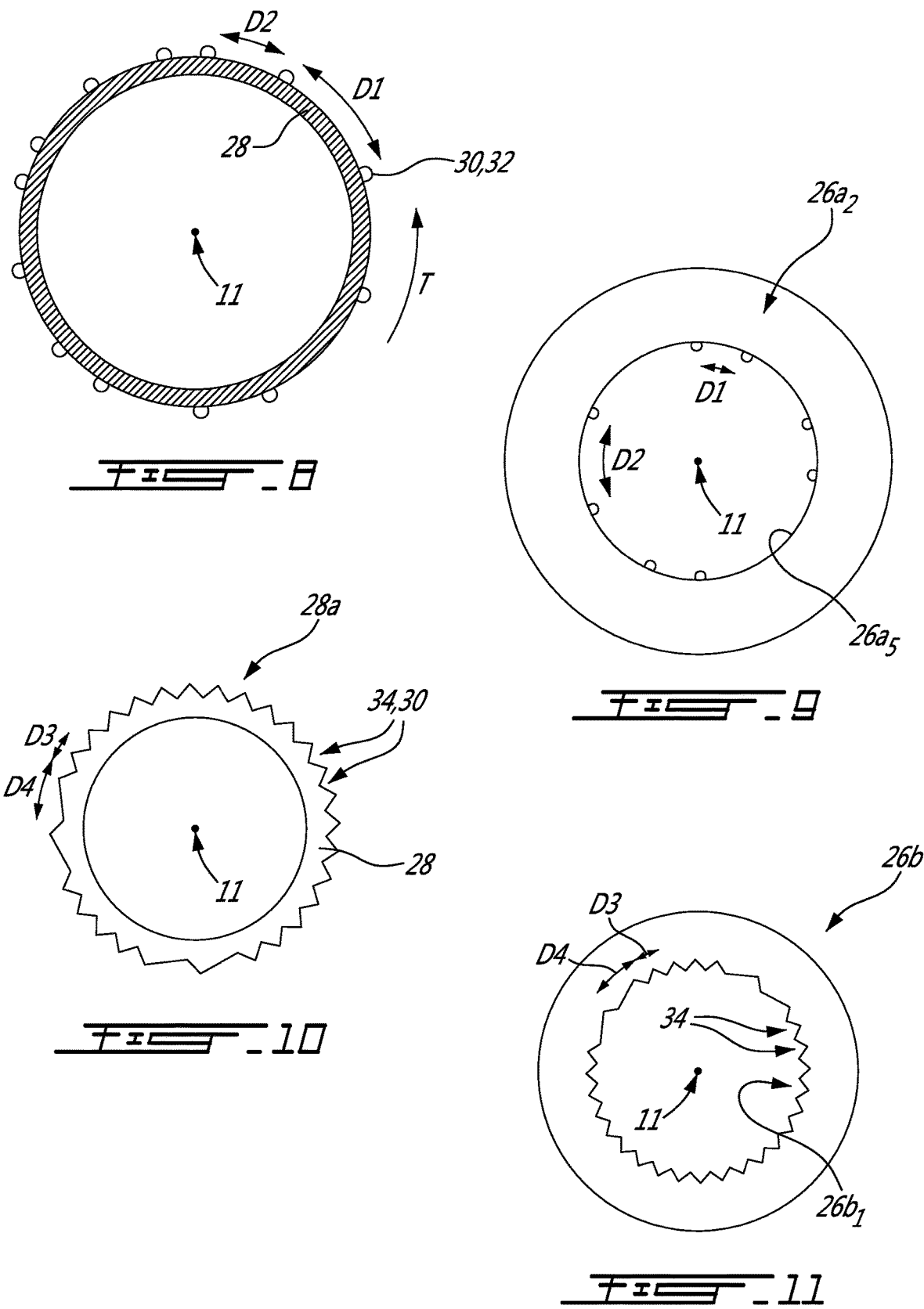

CONTROLLED GAP SEAL WITH SURFACE DISCONTINUITIES

TECHNICAL FIELD

The application relates generally to gas turbine engines and, more particularly, to seals used in gas turbine engines.

BACKGROUND OF THE ART

Controlled gap seals, such as carbon controlled gap seals, are commonly used in gas turbine engines, generally to seal bearing compartments. These seals are designed to run with a tight clearance (e.g., a few thousands of an inch) between a stationary carbon element and a rotating seal runner or shaft, or vice versa. A flow of air may develop between two zones separated by the seal and through the controlled gap. In some cases, this flow of air induces excitation of the rotating seal runner. The excitation may result in cracking of the seal runner. Therefore, improvements are possible.

SUMMARY

In one aspect, there is provided a controlled gap seal for a gas turbine engine, comprising: a ring configured to be in a sealing engagement with a housing, the ring annularly and continuously extending about a central axis; a runner configured for rotation relative to the ring about the central axis, the runner having a runner face facing a ring face of the ring, the ring face spaced apart from the runner face by a gap; and a plurality of surface discontinuities circumferentially distributed around the central axis on the runner face and/or the ring face, the plurality of surface discontinuities spaced relative to one another such that a first set of adjacent surface discontinuities are circumferentially spaced from each other at a different distance than a second set of adjacent surface discontinuities.

In another aspect, there is provided a gas turbine engine, comprising: a controlled gap seal located between a housing and a shaft of the gas turbine engine, the shaft rotating about a central axis of the gas turbine engine, the controlled gap seal including: a ring in a sealing engagement with the housing, the ring annularly and continuously extending about the central axis; a runner secured to the shaft and rotatable relative to the ring, the runner having a runner face facing a ring face of the ring, the ring face spaced apart from the runner face by a gap; and a plurality of surface discontinuities circumferentially distributed around the central axis located on the runner face, a face of the ring that faces the runner, and/or a face of the housing facing the runner, a distance taken between a first set of two adjacent ones of the surface discontinuities being different than that between a second set of two adjacent ones of the surface discontinuities.

In yet another aspect, there is provided a method of operating a controlled gap seal, comprising: imparting a pressure differential between a cavity and an environment outside the cavity; fluidly connecting the cavity to the environment via a gap of the controlled gap seal, the gap located between a rotating component and a static component of the controlled gap seal; and disrupting a flow circulating within the gap by circulating the flow between surface discontinuities circumferentially distributed around a central axis of the controlled gap seal, the surface discontinuities located on the rotating component and/or the static component, a first set of adjacent surface discontinuities are circumferentially spaced from each other at a different distance than a second set of adjacent surface discontinuities.

DESCRIPTION OF THE DRAWINGS

Reference is now made to the accompanying figures in which:

FIG. 4 is a schematic cross-sectional view along line 4-4 of FIG. 3;

FIG. 5 is a schematic cross-sectional view along line 5-5 of FIG. 3;

FIG. 6 is a schematic cross-sectional view along line 6-6 of FIG. 3;

FIG. 7 is a schematic cross-sectional view along line 7-7 of FIG. 3;

FIG. 8 is a schematic cross-sectional view along line 4-4 of FIG. 3 in accordance with another embodiment;

FIG. 9 is a schematic cross-sectional view along line 5-5 of FIG. 3 in accordance with another embodiment;

FIG. 10 is a schematic cross-sectional view along line 6-6 of FIG. 3 in accordance with another embodiment;

FIG. 11 is a schematic cross-sectional view along line 7-7 of FIG. 3 in accordance with another embodiment;

DETAILED DESCRIPTION

Figure 1:
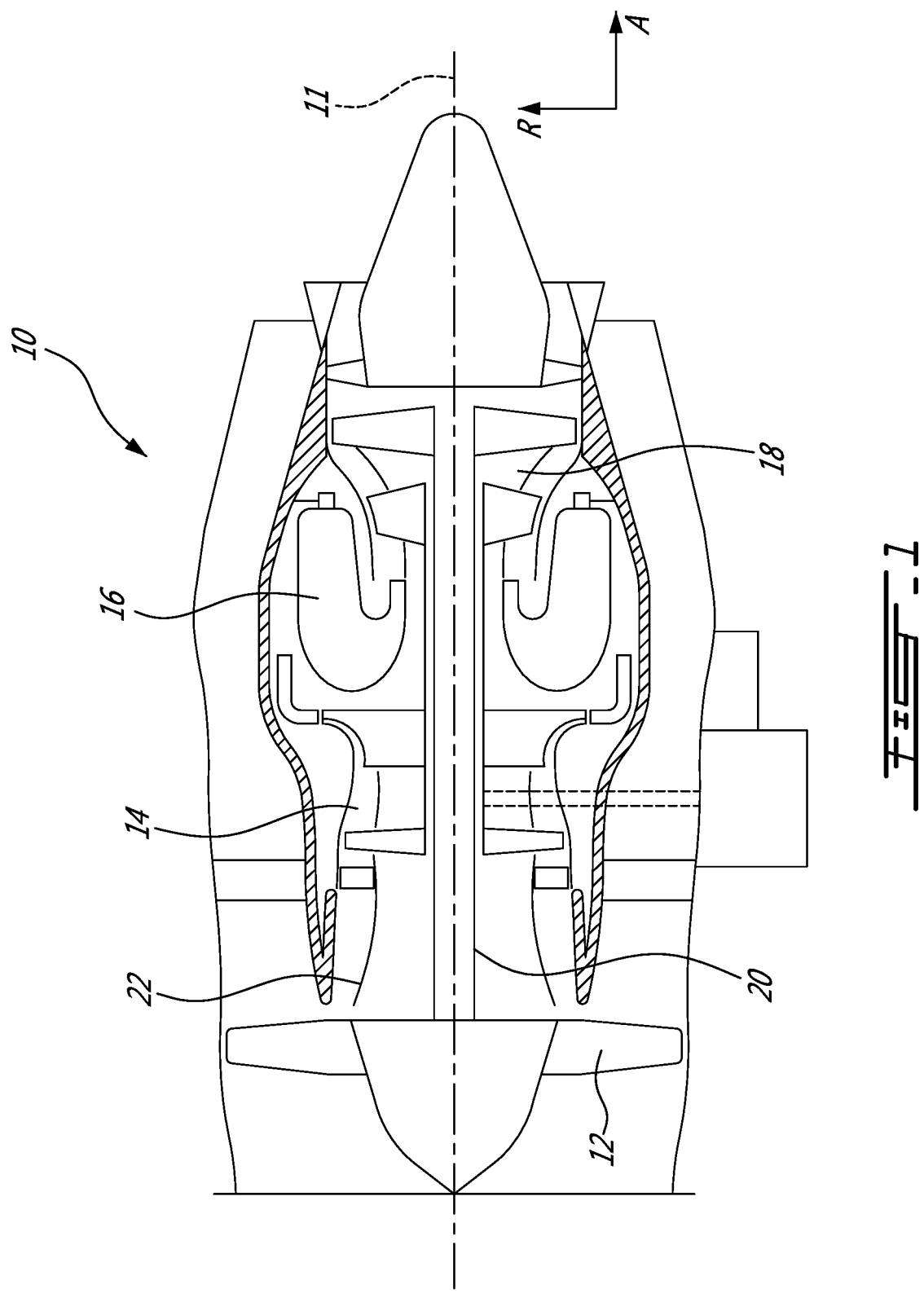
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11 of the gas turbine engine.

The gas turbine engine 10 can include a plurality of bearings which are used to provide a low-friction interface between components which rotate relative to one another, such as between a high pressure shaft 20 and an engine casing 22. Typically, bearings are enclosed in chambers referred to as bearing cavities, and the bearing cavities are partitioned from an environment outside of the bearing cavities, which can be of significantly higher pressure, by seals on each axial side.

Figure 2:
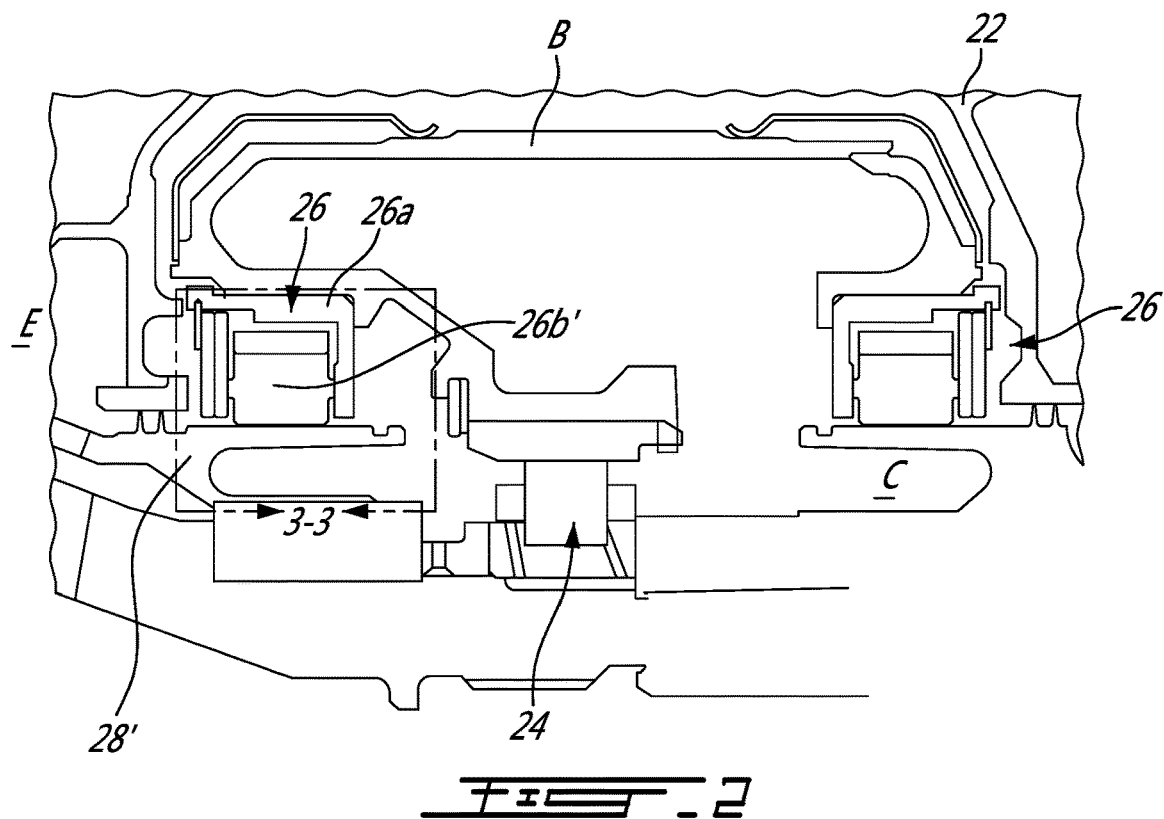
FIG. 2 is an enlarged schematic cross-sectional view of a portion of the gas turbine engine of FIG. 1.
Figure 3:
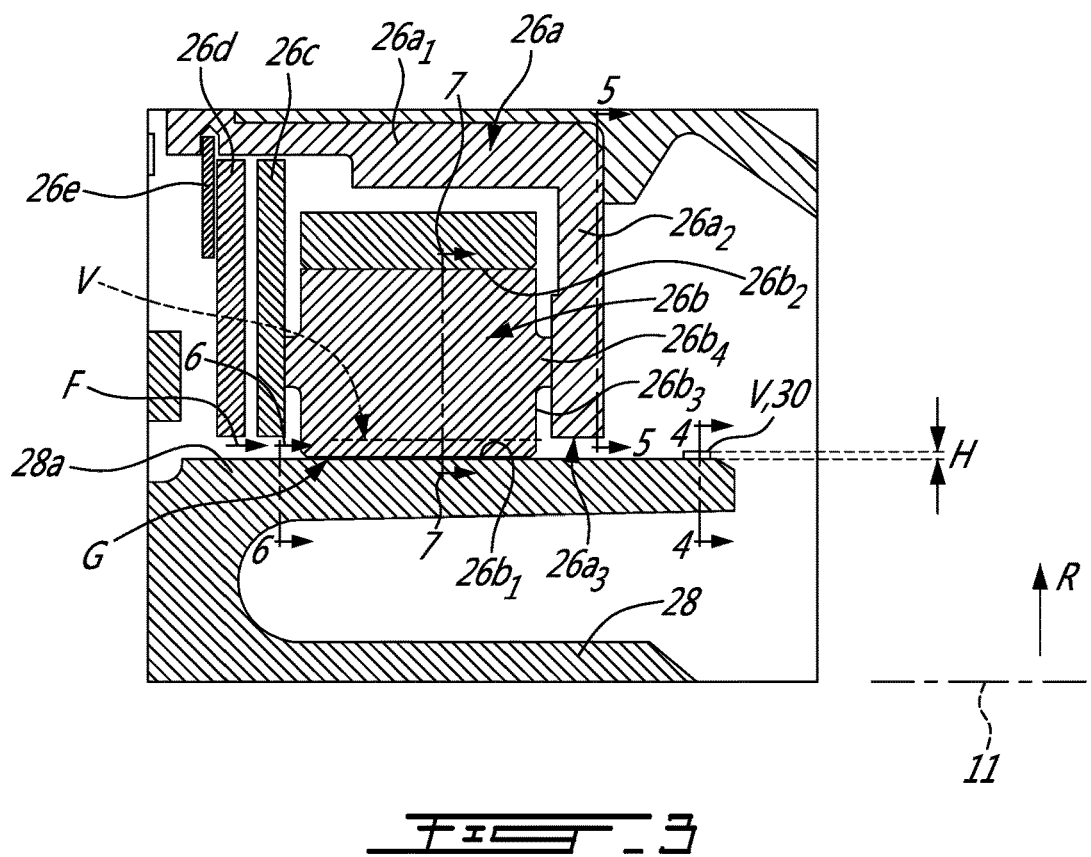
FIG. 3 is an enlarged schematic view of zone 3-3 of FIG. 2.

Referring now to FIGS. 2-3, a bearing 24 is located radially inwardly to the engine casing 22 relative to the central axis 11 and is located within a bearing cavity C. The bearing cavity C is sealed from an environment E outside the bearing cavity C by seals located axially forward and aft of the bearing 24 relative to the central axis 11. In the embodiment shown, one or more of the seals are controlled gap seals 26 that are configured to allow a flow of pressurized air from the environment E outside the bearing cavity C to the bearing cavity C.

For the sake of simplicity, only one of the controlled gap seals 26 is described herein below using the singular form. It is therefore understood that the below description may apply to both of the controlled gap seals 26 if the gas turbine engine 10 has two or more of the controlled gap seals 26.

The controlled gap seal 26 may be supported by a housing 26a, that may or may not be part of the controlled gap seal 26. The housing 26a may be secured to the engine casing 22. In the embodiment shown, the housing 26a is secured to the engine casing 22 via a bearing enclosure B. The housing 26a extends circumferentially around the central axis 11. As illustrated, a cross-section of the housing 26a may have a L-shape having an axial section $26a_1$ and a radial section $26a_2$ extending radially inwardly from an end of the axial section $26a_1$ relative to the central axis 11.

The controlled gap seal 26 may further include a static component 26b', hereinafter a ring 26b, that is located within the housing 26a. In the embodiment shown, the ring 26b is made of carbon. The ring 26b extends annularly and continuously around the central axis 11. The ring 26b has a radially inner face $26b_1$ and a radially outer face $26b_2$ radially spaced from the radially inner face $26b_1$ relative to the central axis 11. The ring 26b has side faces $26b_3$ at both axial ends. The side faces $26b_3$ extend at least partially radially from the radially inner face $26b_1$ to the radially outer face $26b_2$.

One of the ring side faces $26b_3$ may define a protrusion $26b_4$ extending axially away from the ring 26b. The protrusion $26b_3$ is in abutment against the radial section $26a_2$ of the housing 26a such that either the compressed air from the environment E or the lubricant from the bearing cavity C may not circulate between the housing radial section $26a_2$ and the ring side face $26b_3$. The protrusion $26b_4$ may be optional as the ring side faces $26b_3$ may abut the radial section $26a_2$ directly.

In some cases, a pressure differential between the environment E outside the bearing cavity C and the bearing cavity C is sufficient for maintaining the ring in abutment against the housing. However, in the embodiment shown, a biasing member 26c may be located between a washer 26d and the ring 26b for pushing the ring 26b in abutment against the housing 26a. As shown, the washer 26d is retained by a circlip 26e, or other suitable mean, that is received within a groove defined by the housing axial portion $26a_1$.

The controlled gap seal 26 cooperates with a rotating component 28', herein after a runner 28, that rotates about the central axis 11. It is understood that herein the expression runner may be either directed to an element secured to a rotating component (e.g., the shaft 20) of the gas turbine engine 10 or to the rotating component itself. It is also contemplated to have the reverse arrangement, in which the runner is static and the controlled gap seal 26 rotates. In any event, there is relative rotation between the controlled gap seal 26 and the runner 28.

In the embodiment shown, the runner 28 is disposed concentrically to the ring 26b. As shown, the runner 28 is located radially inwardly to the ring 26b relative to the central axis 11. The ring 26b and the runner 28 are rotatable relative to one another. The runner 28 has an outer face 28a. At least a part of the runner outer face 28a faces the radially inner face $26b_1$ of the ring 26b.

In the controlled gap seal 26, a sealing action is provided by a cooperation of the runner 28 and the ring 26b. More specifically, the sealing action is provided by a cooperation of the runner face 28a and the ring radially inner face $26b_1$ that are spaced apart from one another by a gap G. As shown, the gap G is a radial gap extending radially from the runner 28 to the ring 26b and axially along the radially inner face $26b_1$ of the ring 26b. The gap G has a height H taken along a radial direction R relative to the central axis 11.

The height H of the gap G is minimized, but allows a flow F of pressurized air from the environment E outside the bearing cavity C to flow toward the bearing cavity C. In a particular embodiment, this flow F of air may prevent or impede the lubricant from flowing from the bearing cavity C to the environment E outside the bearing cavity C via the gap G.

It has been observed that, in some particular operational conditions (e.g., rotational speed, pressures), the flow F of the pressurized air may cause excitation of the runner 28 when the latter is in rotation about the central axis 11. In some circumstances, the excitation may cause cracking of the runner 28 and may decrease its life span. The excitation may be caused by vortex shedding created by the flow F of pressurized air. Vortex shedding correspond to an oscillating flow that takes place when a fluid (e.g., the pressurized air) passes a body at certain velocities. The vortex shedding has frequencies that might correspond to natural modes of the runner 28, ring, or any adjacent components (e.g., ring 26b, housing 28). Therefore, it might be advantageous to disrupt the flow.

Therefore, the controlled gap seal 26 is provided with vortex disruptors V circumferentially distributed around the central axis 11. The vortex disruptors V may take a plurality of different shapes and may be distributed on a plurality of ways on any of the runner 28, the housing 26a, and the ring 26b. A plurality of possible embodiments are described herein below. The vortex disruptors V are surface discontinuities 30 that interrupt a continuity of a component on which they are located. A surface may be described as continuous if it has a shape without abrupt surface variations such as edges. In the illustrated embodiment, without the surface discontinuities 30, the component would have a continuous cylindrical shape, i.e., the surface would be substantially cylindrical; the surface discontinuities 30 interrupt the continuity of the cylindrical shape.

Referring now to FIG. 4, the surface discontinuities 30 are a plurality of circumferentially distributed tabs 32 located on the runner 28 downstream of the gap G. In the embodiment shown, the tabs 32 are equally spaced from one another along a circumferential direction T relative to the central axis 11. The tabs may be secured to the runner outer face 28a or may be integral to the runner 28 such that the tabs 32 are machined within the material of the runner 28.

Referring now to FIG. 5, the surface discontinuities are a plurality of circumferentially distributed tabs 32 located on the housing radial section $26a_2$ downstream of the gap G. More specifically, the housing radial section $26a_2$ has a radially inner end that defines a radially inner surface $26a_3$ that faces toward the central axis 11. The surface discontinuities 30 are located on the radially inner surface $26a_3$ of the housing radial section $26a_2$. In the embodiment shown, the tabs 32 are equally spaced from one another along the circumferential direction T relative to the central axis 11. The tabs 32 may be secured to the housing 26a or may be integral to the housing 26a such that the tabs 32 are machined within the material of the housing 26a.

Referring now to FIG. 6, the surface discontinuities 30 are a plurality of circumferentially distributed grooves 34 located on the runner 28 upstream of the gap G, resulting for example in a tooth pattern, with triangular teeth or teeth of other shapes. In the depicted embodiment, the grooves 34 are located on the outer face 28a of the runner 28 that faces away from the central axis 11. In the embodiment shown, the grooves 28a are equally spaced from one another along the circumferential direction T. It is understood that the grooves 28a may be replaced by tabs 32 as shown in FIGS. 4-5.

Referring now to FIG. 7, the surface discontinuities are a plurality of circumferentially distributed grooves 34 located on the ring radially inner face $26b_1$. In the embodiment shown, the grooves 34 are equally spaced from one another along the circumferential direction T relative to the central axis 11.

As shown in an alternate embodiment depicted in FIG. 8, the tabs 32 may be non-equally spaced apart from one another along the circumferential direction T. In other words, a distance D1, taken along the circumferential direction T, between a first set of two adjacent ones of the tabs 32 is different than a distance D2 between a second set of two adjacent ones of the tabs 32. In a particular embodiment, the distance between each two adjacent ones of the tabs 32 varies throughout a circumference of the runner 28. Similarly, and as shown in an alternate embodiment depicted in FIG. 9, the tabs 32 located on the housing 26a are non-equally spaced apart from one another along the circumferential direction T.

As shown in an alternate embodiment depicted in FIG. 10, the grooves are non-equally spaced apart from one another along the circumferential direction. In other words, a distance D3, taken along the circumferential direction, between a first set of two adjacent ones of the grooves 34 is different than a distance D4 between a second set of two adjacent ones of the grooves 34. In a particular embodiment, the distance between each two adjacent ones of the grooves 34 varies throughout a circumference of the runner 28. As shown in an alternate embodiment depicted in FIG. 11, the grooves 34 on the ring 26b are non-equally spaced apart from one another along the circumferential direction T.

It is understood that the surface discontinuities, whether they are tabs 32 and/or grooves 34 may be located solely on either one of the housing 26a, the runner 28, and the ring 26b. Alternatively, the tabs 32 and/or grooves 34 may be used in combination and distributed on any possible combination of the housing 26a, the ring 26b, and the runner 28 without departing from the scope of the present disclosure. In a particular embodiment, a height H2 (FIG. 4) of the tabs 32, or a depth D (FIG. 6) of the grooves 34, taken in the radial direction R relative to the central axis 11 corresponds to at most the height H of the gap G.

Figure 12A:
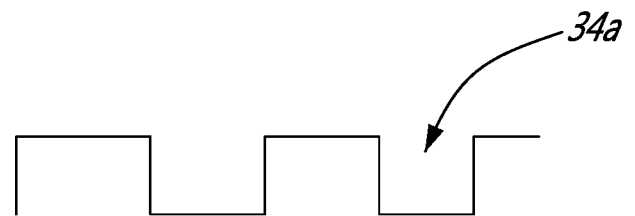
FIGS. 12a to 12c are schematic cross-sectional views illustrating possible embodiments of grooves.
Figure 12B:
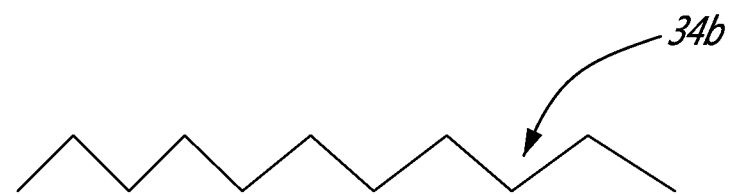
Figure 12C:
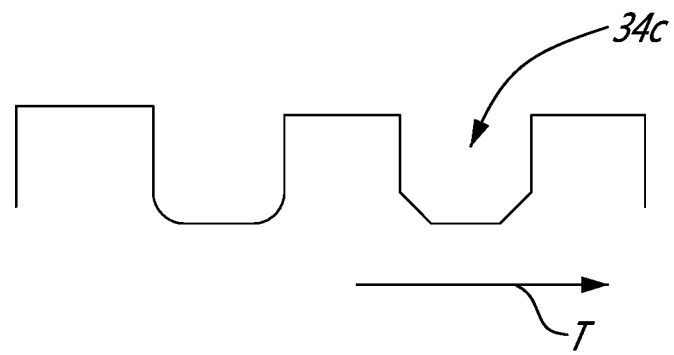

Referring now to FIGS. 12a to 12c, the grooves, whether they are located on the ring 26b, the housing 26a, and/or the runner 28, may take a plurality of shapes. As shown in FIG. 12a, the grooves 34a may have a square shape. As shown in FIG. 12b, the grooves 34b may have a triangular shape. As shown in FIG. 12c, the grooves 34c may vary in shape along the circumferential direction T relative to the central axis 11. The groove shape may alternate along the circumferential direction T. In the embodiment shown, a first one of the grooves 34c has a U-shape with rounded corners and a second one of the grooves 34c has a U-shape with straight corners. Any combination of the grooves shown in FIGS. 12a to 12c may be used. Other suitable shape of grooves may be used without departing from the scope of the present disclosure.

Figure 13A:
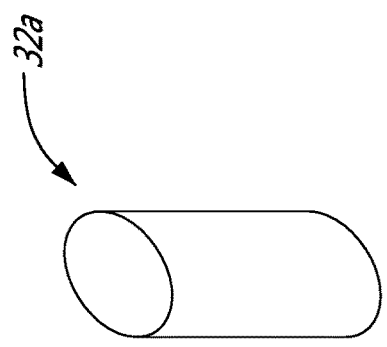
FIGS. 13a to 13f are schematic cross-sectional views illustrating possible embodiments of tabs.
Figure 13B:
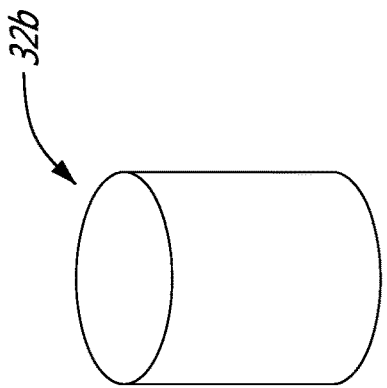
Figure 13C:
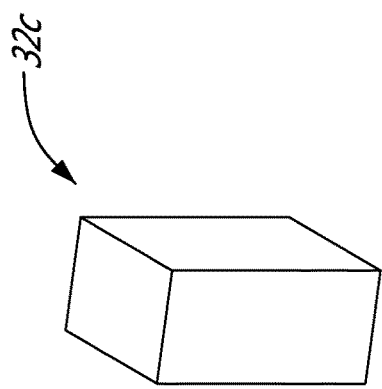
Figure 13D:
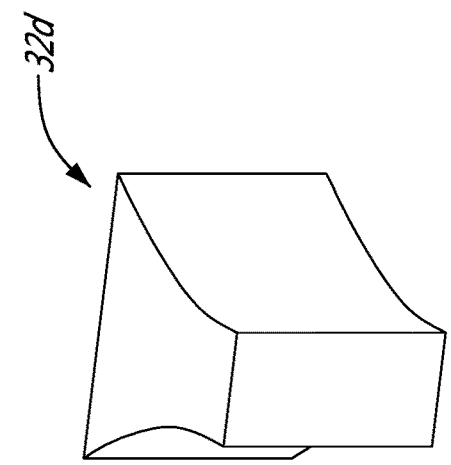
Figure 13E:
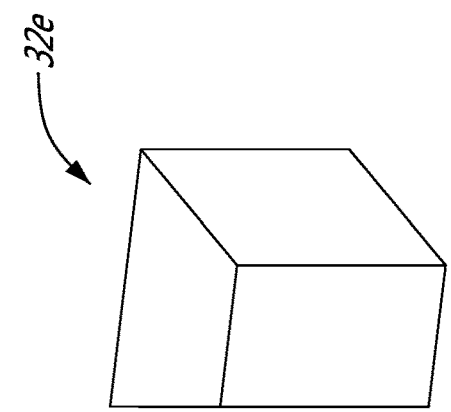
Figure 13F:
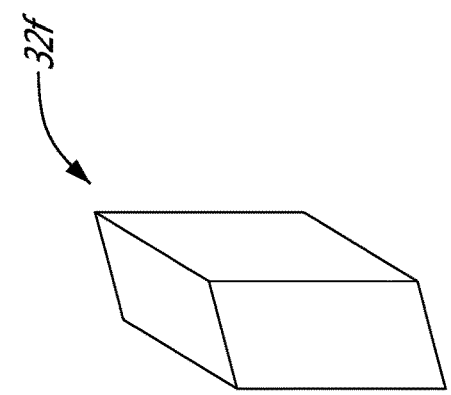

Referring now to FIGS. 13a to 13f, the tabs 32, whether they are located on the ring 26b, the housing 26a, and/or the runner 28, may take a plurality of shapes. Any suitable shape may be used. For instance, an elliptical cylinder 32a (FIG. 13a), a cylinder 32b (FIG. 13b), a rectangular prism 32c (FIG. 13c), a trapezoidal prism 32d (FIG. 13e), and a parallelepiped 32e (FIG. 13f) may be used. As shown in FIG. 13d, the tab 32f may have any shape such as a curved trapezoidal shape without departing from the scope of the present disclosure. Either one of the tabs 32a to 32f of FIGS. 13a to 13f may be secured to either one of the housing 26a, the runner 28, and the ring 26b at any orientation.

Figure 14A:
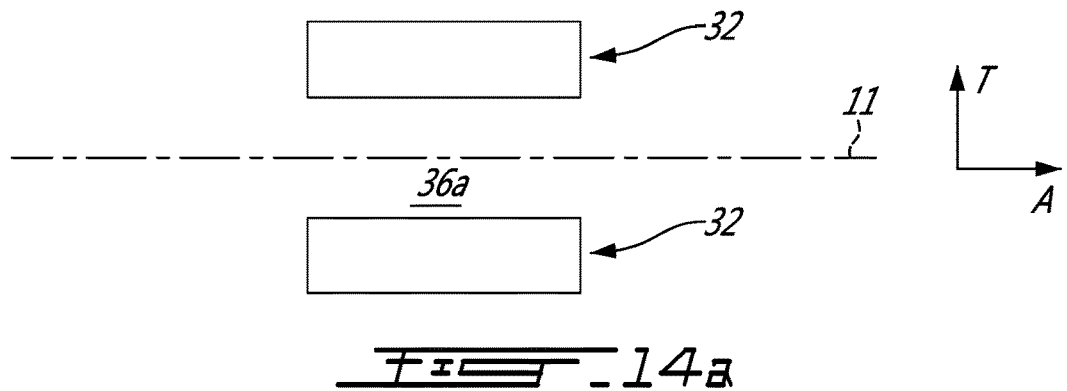
FIGS. 14a to 14c are schematic top views of surface discontinuities in accordance with different embodiments.
Figure 14B:
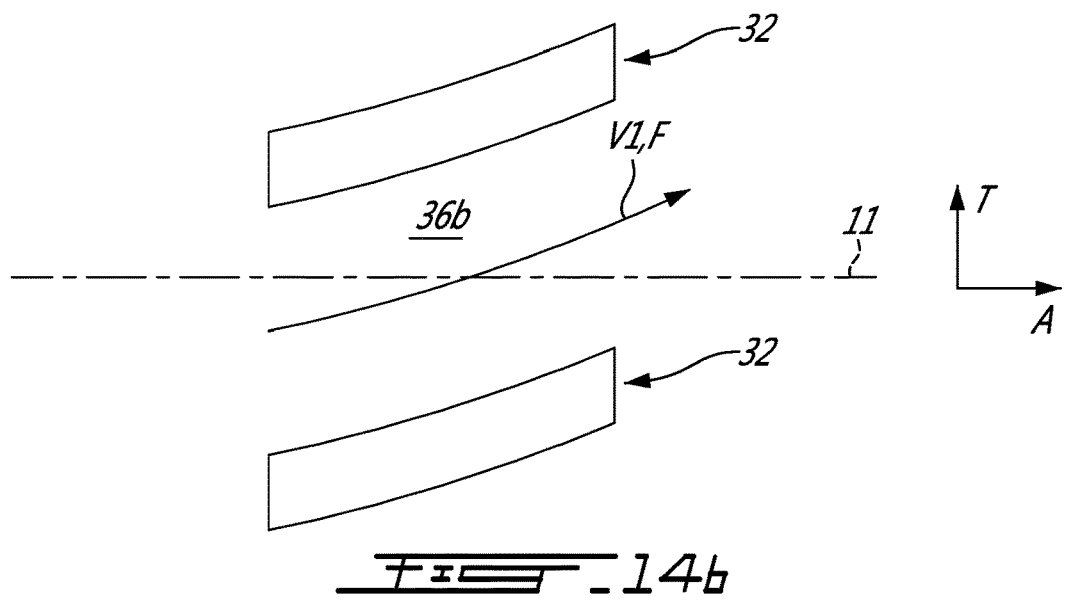
Figure 14C:
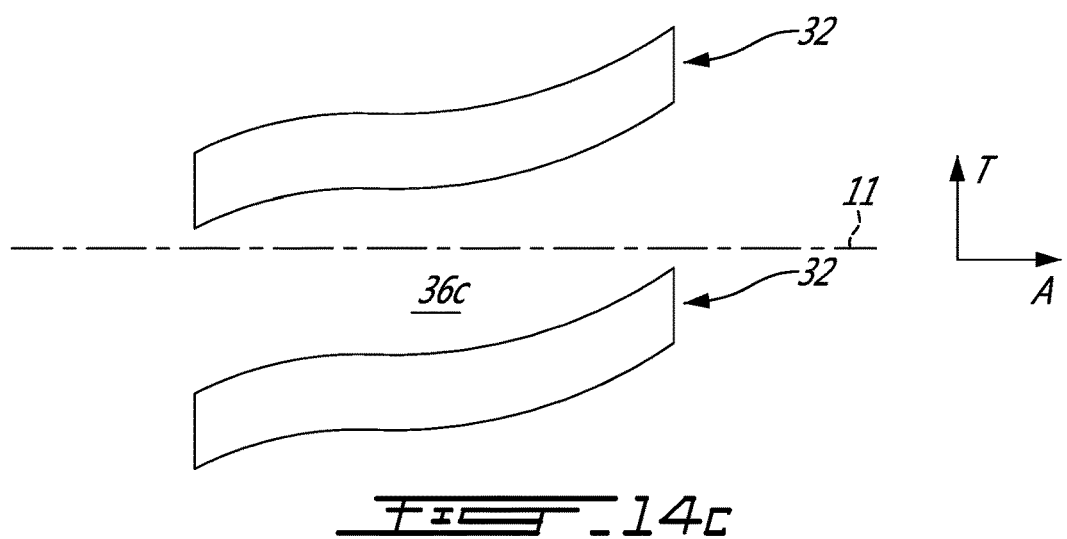

Referring now to FIGS. 14a to 14c, two adjacent ones of the tabs 32 define a channel therebetween. As shown in FIG. 14a, the channel 36a may extend solely in the axial direction A relative to the central axis 11. As shown in FIG. 14b, the channel 36b may extend in both the axial direction A and the circumferential direction T. When extending in the circumferential direction T, the channel 36b may extend either in a same direction as a direction of rotation of the runner 28 or in a direction opposite the direction of rotation of the runner 28. As shown in FIG. 14c, the channel 36c has an S-shape and extend in both the axial A and circumferential T directions. In this embodiment, a portion of the channel extends in the same direction as the direction of rotation of the runner 28 whereas another portion of the channel 36c extends in the direction opposite the direction of rotation of the runner. In a particular embodiment, having the flow circulating in both the direction of rotation of the runner 28 and in the opposite direction thereof may generate less disruption and/or may allow an even mixing.

Referring to FIGS. 2 and 4 to 6, for operating the controlled gap seal 26 a pressure differential is imparted between the bearing cavity C and the environment E. The bearing cavity C and the environment E are fluidly connecting via the gap G. The flow F circulating within the gap G is disrupted by circulating the flow between surface discontinuities 30 circumferentially distributed around the central axis 11 of the controlled gap seal 26 and equally distanced from one another along the circumferential direction T relative to the central axis 11. The surface discontinuities 30 are located either upstream of the gap G and on the rotating component 28' or located downstream of the gap G and on at least one of the rotating component 28' and the static component 26b'.

In the embodiment shown, circulating the flow F between the surface discontinuities 30 includes imparting a circumferential component to a flow direction V1 (FIG. 14) of the flow F. In a particular embodiment, imparting the circumferential component includes imparting the circumferential component in a direction opposite a direction of rotation of the rotating component 28'. As shown in FIGS. 4-5, circulating the flow F between the surface discontinuities 30 includes circulating the flow between tabs 32. In the embodiment of FIGS. 6-7, circulating the flow F between the surface discontinuities 30 includes circulating the flow within grooves 34.

Referring now to FIGS. 8 to 11, for operating the controlled gap seal 26, a pressure differential is imparted between the bearing cavity C and the environment E. The bearing cavity C and the environment E are fluidly connecting via the gap G. The flow F within the gap G is disrupted by circulating the flow F between the surface discontinuities 30 circumferentially distributed around the central axis 11. The surface discontinuities 30 are located on at least one of the rotating component 28' and the static component 26b'. The distance D1 taken between the first set of two adjacent ones of the surface discontinuities 30 is different than the distance D2 between the second set of two adjacent ones of the surface discontinuities 30.

In a particular embodiment, the surface discontinuities 30 allow to modify and disrupt the flow F to result in attenuation of the strength of a dominant excitation of the frequency of the vibrations. In a particular embodiment, the surface discontinuities 30 mistune the frequency of the vibrations and the natural mode frequency of the runner 28. In a particular embodiment, the surface discontinuities 30 allow to change an acoustic impedance or resistance of a wave generated in the bearing cavity C.

In a particular embodiment, having the surface discontinuities equally distributed results in strong dominant excitation/frequency based on a number of the surface discontinuities. For instance, if 5 equally spaced surface discontinuities 30 are used, the frequency will correspond to five time the engine revolution frequency or its harmonics. This might allow to tune the downstream component to avoid this frequency or define the number of surface discontinuities 30 based on the downstream components natural response.

In a particular embodiment, having the surface discontinuities non-equally distributed results in sharing energy and attenuating the dominant response. For instance, if 5 unequally surface discontinuities 30 are used, the result would be a combination of two equally distributed discontinuities adjacent three other equally distributed discontinuities 30 and will result in 2E, 3E, 4E and 5E. The total energy remains constant will be shared and result in attenuation of the strength of 5E or its harmonics.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A controlled gap seal for a gas turbine engine, comprising:
    a ring configured to be in a sealing engagement with a housing, the ring annularly and continuously extending about a central axis;
    a runner configured for rotation relative to the ring about the central axis, the runner having a runner face facing a ring face of the ring, the ring face spaced apart from the runner face by a gap; and
    a plurality of surface discontinuities being tabs circumferentially distributed around the central axis and extending from the runner face and/or the ring face, the plurality of surface discontinuities spaced relative to one another such that a first set of adjacent surface discontinuities are circumferentially spaced from each other at a different distance than a second set of adjacent surface discontinuities.

2. The controlled gap seal of claim 1, wherein the tabs have a cylindrical shape.

3. The controlled gap seal of claim 1, wherein the surface discontinuities further include grooves.

4. The controlled gap seal of claim 3, wherein the grooves have a square cross-section.

5. The controlled gap seal of claim 1, wherein the surface discontinuities are located on both of the runner face and the ring face.

6. The controlled gap seal of claim 1, comprising additional surface discontinuities being located on a face of the housing that is oriented toward the runner.

7. The controlled gap seal of claim 1, wherein a height of the surface discontinuities along a radial direction relative to the central axis is less than that of the gap.

8. A controlled gap seal for a gas turbine engine, comprising:
    a ring configured to be in a sealing engagement with a housing, the ring annularly and continuously extending about a central axis;
    a runner configured for rotation relative to the ring about the central axis, the runner having a runner face facing a ring face of the ring, the ring face spaced apart from the runner face by a gap; and
    a plurality of surface discontinuities circumferentially distributed around the central axis and on the runner face and/or the ring face, the plurality of surface discontinuities spaced relative to one another such that a first set of adjacent surface discontinuities are circumferentially spaced from each other at a different distance than a second set of adjacent surface discontinuities, for each two adjacent ones of the surface discontinuities, a channel is defined therebetween, the channel extending in both an axial direction relative to the central axis and a circumferential direction.

9. The controlled gap seal of claim 8, wherein a height of the surface discontinuities along a radial direction relative to the central axis is less than that of the gap.

10. The controlled gap seal of claim 8, wherein the surface discontinuities are located on both of the runner face and the ring face.

11. The controlled gap seal of claim 8, wherein the surface discontinuities are tabs extending from the runner face and/or the ring face.

12. A controlled gap seal for a gas turbine engine, comprising:
    a ring sealingly engaged to a housing, the ring annularly and continuously extending about a central axis;
    a runner configured for rotation relative to the ring about the central axis, the runner having a runner face facing a ring face of the ring, the ring face spaced apart from the runner face by a gap; and
    a plurality of surface discontinuities circumferentially distributed around the central axis on the ring face, the plurality of surface discontinuities spaced relative to one another such that a first set of adjacent surface discontinuities are circumferentially spaced from each other at a different distance than a second set of adjacent surface discontinuities.

13. The controlled gap seal of claim 12, comprising additional surface discontinuities on a face of the housing and/or on the runner face.

14. The controlled gap seal of claim 12, wherein the surface discontinuities are tabs extending from the face of the housing.

15. The controlled gap seal of claim 14, wherein the tabs have a cylindrical shape.

16. The controlled gap seal of claim 12, wherein the surface discontinuities further include grooves.

17. The controlled gap seal of claim 16, wherein the grooves have a square cross-section.

18. The controlled gap seal of claim 12, wherein, for each two adjacent ones of the surface discontinuities, a channel is defined therebetween, the channel extending in an axial direction relative to the central axis.

19. The controlled gap seal of claim 18, wherein the channel further extends in a circumferential direction relative to the central axis.

20. The controlled gap seal of claim 12, wherein a height of the surface discontinuities along a radial direction relative to the central axis is less than that of the gap.

* * * * *